UNITED STATES PATENT OFFICE.

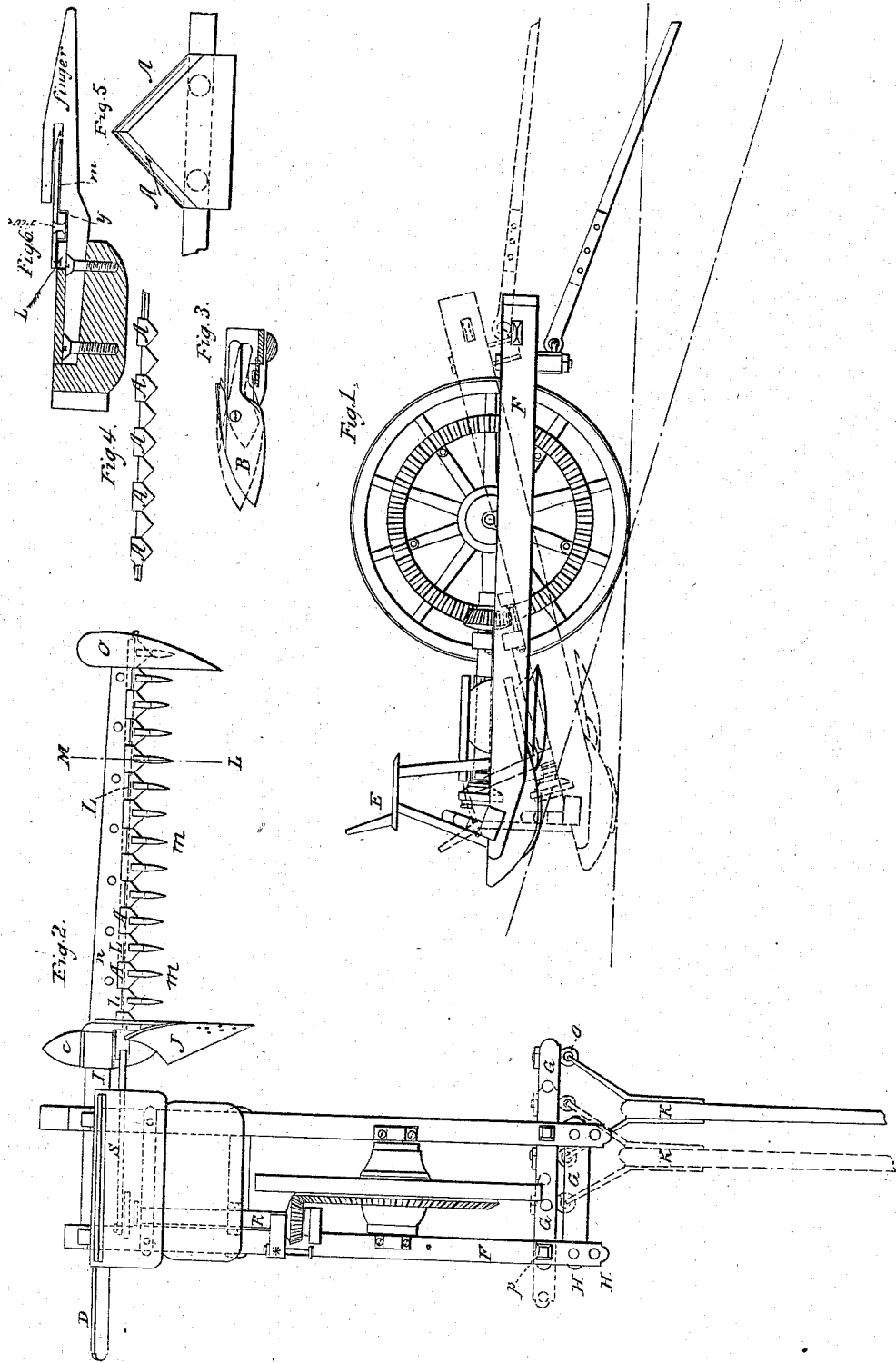

GEO. ESTERLY, OF HEART PRAIRIE, WISCONSIN.

IMPROVEMENT IN GRASS-HARVESTERS.

Specification forming part of Letters Patent No. 11,155, dated June 27, 1854.

*To all whom it may concern:*

Be it known that I, GEORGE ESTERLY, of Heart Prairie, county of Walworth, and State of Wisconsin, have made and invented Improvements in Mowing-Machines; and I do hereby declare that the following is a full and exact description thereof, reference being had to the accompanying drawings, and to the letters of reference marked thereon.

The object of my invention is, first, to improve the common grain and grass sickle in such a manner as to prevent its clogging on the fingers or behind the sickle-bar; second, to construct the sickle and sickle-sill in such manner as to obviate the necessity of a reel to carry the cut grass over the sickle-sill; third, to construct the sickle and fingers in such manner as for the sickle to form a shear-edge with each finger, so as to cut with less motion, less force, and less strain on the machine, and also to make it a self-sharpener, and doing away with the necessity of grinding the sickle; fourth, to construct and attach a plow in such a manner as will most effectually remove the cut grass out of the way of the shoe; fifth, to construct the machine in such manner as to enable it to accommodate itself to any unevenness of the surface of the ground; sixth, to attach the draft-beam to the machine in such a manner that by an easy adjustment to throw the weight either on the main or driving wheel or on the sickle-sill; seventh, to attach the tongue to the draft-beam in such a manner as to take off the side draft.

Having thus stated the object of my improvements, I do hereby declare the following to be a description of the construction and operation of my machine, reference being had to the annexed drawings, making a part of this specification, in which—

Figure 1 is a longitudinal elevation of the machine; Fig. 2, a plan of the same; Fig. 3, a longitudinal view of the plow; Fig. 4, a portion of the sickle; Fig. 5, the upper side of one of the wide sections of the sickle, showing also the cast-steel bar to which the sections are riveted; and Fig. 6, a sectional view from L to M of Fig. 2.

To enable any one skilled in the manufacturing of machines to manufacture my machine, I will proceed to describe its construction and operation.

First, to construct the sickle as shown in Figs. 2 and 4, (letters A,) cut out the sections, as shown at Fig. 4, from sheet cast-steel. Then grind the bevel on the upper side and cut the sickle-edge in such a manner as to leave the cutting-edge even with the lower side of the sections. Then grind off the raised portion made by the chisel in cutting the teeth from the inner and upper side of the bevel, leaving the teeth full on the cutting-edge, as shown at Fig. 5. Then turn the section and grind it smooth and level on the under side. Then rivet the wide and narrow sections alternately on the sickle-bar, as shown at Fig. 4, the sections to be riveted with the face or cutting side on the sickle-bar, so as to have the bar on the under side of the sickle.

The sickle-bar should be five-eighths by three-sixteenths of an inch cast-steel.

The object and great advantage of grinding off the inner portion of the file-like teeth of the sections, as shown at A, Fig. 5, is that it entirely prevents the gumming and clogging of the sickle. When constructed as above described it has all the advantages of a serrated sickle for cutting, and the non-liability of a smooth-edged sickle to clogging. Every alternate section should project about half an inch behind the sickle-bar, so as to have a bearing on the bar, (letter L, Fig. 6,) and as shown at L L, Fig. 2, by the dotted lines, against which bar the sickle-bar slides when in motion. The upper portion of said bar L, Fig. 6, should be level with the fitted portion M of the fingers, as shown at Fig. 6. The object of such a combination is twofold: first, to cause the sickle to form a shear-edge with the fitted portion M, Fig. 6, of the fingers; and, secondly, the portion of each alternate section that projects over the bar L, Figs. 2 and 6, removes, by scraping off, the fine-cut grass or gummy substance that usually collects and clogs the sickle.

The sickle-sill, Fig. 2, N, is made of wood, five and one-half inches wide where it is attached to the shoe C, Fig. 2, and three and one-half inches wide at the other end, and about two inches thick; and a bar of tire-iron is screwed to the back edge of the sickle-sill to give it strength. The fingers M are let in the sill N and each fastened by two screws, as shown in Fig. 6, the fitted surface M, Fig. 6, of all the fingers being set in a straight line for the sickle, Fig. 4, to run on. The fingers M, Figs. 2 and 6, may be made in any of the usual forms, with a recess or rabbet, as shown at Y, Fig. 6, in each, wherein the sickle-bar runs, (the bar being on the under side of the sickle,) the recess being equal in depth to the thickness of the sickle-bar, or a little more, below the fitted surface M of the finger, Fig. 6, allowing the sickle to have no other bearing except on the bar L, Figs. 2 and 6, and on the fitted surface of the fingers M, Fig. 6.

The shoe under the dividing-finger O, Fig. 2, at the small end of the sill N, is made by bending a piece of band-iron to any desired form and bolting it through the sill N and the dividing-finger O, Fig. 2. The forward end of the shoe is attached to the dividing-finger O on the under side.

The plow (letter J, Figs. 2 and 3) is made as follows: Take a piece of one and one-half-inch plank, about three feet long and ten inches wide, and cut it as shown at B, Fig. 3, or in the form of the side piece of a common dirt-scraper, or any other desirable form; then take a piece of three-quarter-inch board about eighteen inches long and cut it in the form shown at J, Fig. 2, attach it to the plank B, Fig. 3, as shown at J, Fig. 2, and then fasten it to the end of the sickle-beam I by means of a bolt passing through the plank, as shown by the bolt-head near letter B, Fig. 3, and screwed in the end of the sickle-beam I, Fig. 2, on which bolt the plow turns or is allowed an upward-and-downward motion, the forward end resting on and sliding over the uneven surface of the ground. The mold-board or upper portion of the plow raises the cut grass and turns it out of the way of the shoe, (letter C, Fig. 2.)

The shoe to which the sickle-sill (letter N, Fig. 2) is attached is fastened on the end of the sickle-beam, (letter I, Fig. 2,) and is made of cast-iron in such a form as to receive the sickle-sill N, Fig. 2. A portion of the casting also forms a shoe for the sickle-sill N to slide on.

The sickle-beam (letter I, Fig. 2) is made of any desired size and bolted on the frame, (letter F, Fig. 2,) and projects about sixteen inches to the left of the frame F, as shown in Fig. 2.

The frame (letter F, Figs. 1 and 2) is made in any of the known forms, of suitable dimensions for the wheel, gearing, crank-shaft, and connecting-rod, which are also made in any of the usual forms.

The seat (letter E, Fig. 1) is made in any desirable form, and is attached to the frame F, Fig. 1.

The lever (letter D, Fig. 2) is about three feet long, and is attached to the frame, (letter F, Fig. 1,) so as to enable the driver to cant over the machine and raise the sickle-sill N, Fig. 2, over any obstruction that may endanger the sickle.

The draft-beam G G, Fig. 2, is made of about the same length as the sickle-beam, (letter I, Fig. 2,) and of a size sufficient for the strength required. It is attached to the frame F, Figs. 1 and 2, in such a manner as to be movable backward or forward, either on the upper or lower side of the frame F, as shown by the holes (letter H, Fig. 2) on the frame F, Fig. 2, which is done by moving the bolts (letter p, Fig. 2) in the holes H and placing the draft-beam on the upper or lower side of the frame F, Fig. 2. The object of this arrangement is to get the draft in such position as to increase or diminish the weight on the lower or cutting portion of the machine. It may be varied to compensate for a light or heavy driver, or for any other circumstance that will lessen or add to the weight on the sickle-sill or friction of the shoes underneath it. There are also a se-series of horizontal holes in the draft-beam, in which the eyes or bolts Q, Fig. 2, are placed, to which the braces of the tongue K, Fig. 2, are attached, and which are movable, as shown by the dotted and straight lines of the tongues K K. The object is to take off the side draft, which is done by moving the tongue to the left until the machine draws square or equal on the team, which will vary in proportion to the amount of resistance to be overcome in cutting different kinds of grass.

I have thus set forth the manner of constructing and operating my machine.

Now, I do not claim the frame, (letter F, Fig. 2,) nor the driver's seat thereon, (letter E,) nor the tongue K, nor the driving-wheel, gearing, gearing-shaft, (letter R, Fig. 2,) nor the connecting-rod S, Fig. 2, nor the shoe C, Fig. 2, nor the sickle-beam I, Fig. 2, nor the sickle-sill N, Fig. 2, nor the dividing-finger O, Fig. 2, nor the lever D, Fig. 2.

What I claim as my invention, and desire to secure by Letters Patent of the United States, is—

1. The construction of the sickle A in such manner as to have projections A on alternate sections of the sickle sliding upon bar L, operating for the purposes set forth.

2. Grinding off the raised or feather edge made by the chisel in cutting the sickle A, as set forth in the specification.

3. The attachment of plow I to the sickle-beam by a screw-pivot to fit said plow to the surface of the soil, in the manner and for the purposes set forth.

GEORGE ESTERLY.

Witnesses:
SAML. GRUBB,
LEONARD STORM.